(12) United States Patent
Gatch

(10) Patent No.: US 10,587,112 B1
(45) Date of Patent: Mar. 10, 2020

(54) MONITOR CIRCUIT

(71) Applicant: Harry Gatch, Summerville, SC (US)

(72) Inventor: Harry Gatch, Summerville, SC (US)

( * ) Notice: Subject to any disclaimer, the term of this patent is extended or adjusted under 35 U.S.C. 154(b) by 330 days.

(21) Appl. No.: 15/598,900

(22) Filed: May 18, 2017

Related U.S. Application Data

(60) Provisional application No. 62/337,946, filed on May 18, 2016.

(51) Int. Cl.
| | |
|---|---|
| *H02H 3/20* | (2006.01) |
| *H02H 3/22* | (2006.01) |
| *H02H 3/28* | (2006.01) |
| *H02H 3/14* | (2006.01) |
| *H02H 3/12* | (2006.01) |

(52) U.S. Cl.
CPC .............. *H02H 3/207* (2013.01); *H02H 3/12* (2013.01); *H02H 3/14* (2013.01); *H02H 3/22* (2013.01); *H02H 3/28* (2013.01)

(58) Field of Classification Search
CPC .............. H02H 3/207; H02H 3/12; H02H 3/14
See application file for complete search history.

(56) References Cited

U.S. PATENT DOCUMENTS

| | | | | |
|---|---|---|---|---|
| 4,016,518 A | * | 4/1977 | Lang ...................... | H01H 83/20 335/7 |
| 5,077,628 A | * | 12/1991 | Neuhouser ............. | H02H 7/222 361/102 |
| 2011/0102052 A1 | * | 5/2011 | Billingsley ............ | H01H 9/542 327/365 |

* cited by examiner

*Primary Examiner* — Scott Bauer
(74) *Attorney, Agent, or Firm* — B. Craig Killough; Barnwell Whaley Patterson & Helms, LLC

(57) ABSTRACT

A monitor circuit that monitors power delivered by an electrical utility or other source to a consumer. The device may be located at or near an entry point, such as near an electrical meter. The device senses a material change in voltage, and terminates power to the consumer until normal voltage is restored. The device automatically resets when normal voltage is restored, without need for a service call.

18 Claims, 3 Drawing Sheets

MONITOR CIRCUIT

Applicant claims the benefit of Provisional Application Ser. No. 62/337,946 filed May 18, 2016.

FIELD OF THE INVENTION

This invention relates to electric power transmission generally and is more specifically related to a monitor circuit for a consumer location.

BACKGROUND OF THE INVENTION

Electrical power losses result in substantial property damage to consumers. Voltage variations and fluctuations damage electrical devices and electrical equipment, and present a fire risk.

Power generating companies have electrical systems designed to protect their equipment, but these systems are not designed or intended to protect the consumer. Power interruptions or deviations may occur due to unintentional breaks in power lines, such as when contractors are digging near buried power lines, or when utility poles and the attendant power lines are downed due to weather or accidents. Improper electrical installations or connections by electrical contractors may also result voltage deviations, as will equipment failures in the electrical power supply system between the generator and the consumer.

There is a need for a device that senses a material change in voltage that is delivered by the utility company, and which terminates power to the consumer in the event of a material change in voltage. The device should reset when normal voltage is restored without a service call.

SUMMARY OF THE INVENTION

The present invention is a device comprising a monitor circuit that monitors power delivered by an electrical utility or other source to a consumer. The device may be located at or near an entry point, such as near an electrical meter. The device senses a material change in voltage, and terminates power to the consumer until normal voltage is restored. The device automatically resets when normal voltage is restored, without need for a service call. The device may be easily and inexpensively installed at the consumer's location. The device may be independent of other devices at the consumer location, or it may be incorporated into an electrical meter at the time of manufacture of the electrical meter.

BRIEF DRAWING DESCRIPTION

DESCRIPTION OF PREFERRED EMBODIMENTS

In one embodiment, the device is a monitor circuit for an interruptible 240 volts AV single-phase power source. The circuit uses a center tap to provide for 240 volt and 120 volt loads.

Energy flows through an uneven parallel circuit from source (L1) to the neutral. One path is through the primary winding of transformer (T1). See FIG. 1. The second path is through resister (R1) and the primary winding of transformer (T2).

The secondary of transformer (T1) provides sufficient voltage to energize relay (K1), closing the normally open contact in the interrupter enable circuit from source (L2) to the neutral.

The secondary of transformer (T2) does not provide sufficient voltage to energize relay (K2) due to the presence of resister (R1). This leaves the normally closed contacts of relay (K2) in the interrupter enable circuit closed, completing the circuit, enabling the interrupter to provide 240 volts to the load.

The loss of energy through the primary of transformer (T1) de-energizes relay (K1) normally open contacts in the interrupter enable circuit open, interrupting 240 volts AC to the load.

Source (L2) provides the power to the interrupter enable circuit. Without power, the interrupter interrupts 240 volts AC to the load.

When there is loss of neutral, the uneven parallel circuit redirects energy flow from source (L1) to source (L2) through the interrupter enable circuit, increasing or decreasing total flow.

An increase will provide sufficient energy to the secondary of transformer (T2) to energize relay (K2). This will open the normally closed contacts of relay (K2) de-energizing the interrupter enable circuit, interrupting 240 volts AC to the load.

A decrease in total energy flow will not provide enough energy from the secondary of transformer (T1) to keep relay (K1) energized. The normally open contact of relay (K1) will open in the interrupter enable circuit, disabling the interrupter, interrupting 240 volts AC to the load.

Figure 1:
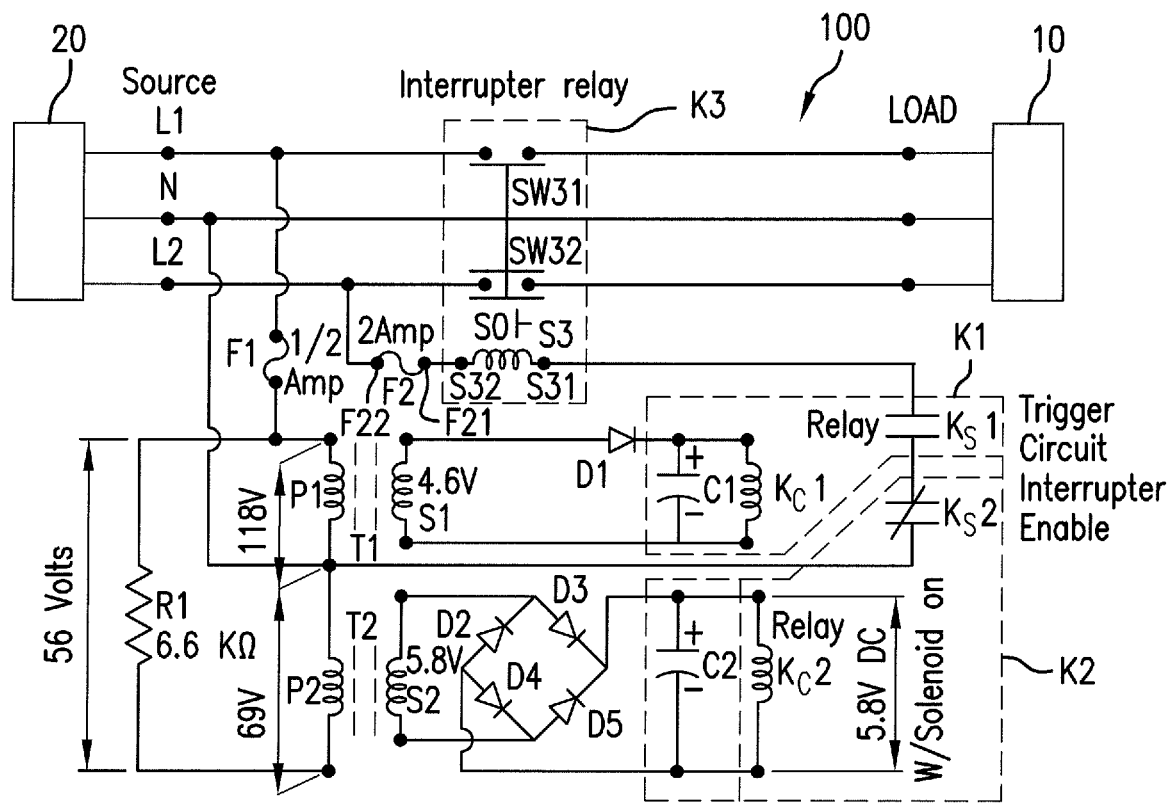
FIG. 1 is a schematic diagram of a preferred embodiment of the monitor circuit of the present invention.

In FIG. 1, a preferred embodiment of the monitor circuit (or the "monitor" or the "interrupter") of the present invention is indicated generally as 100. Monitor 100 has a transformer T1 having a primary winding P1, a secondary winding S1, and a diode D1; a transformer T2 having a primary winding P2 and a secondary winding S2; a resistor R1; diodes D2, D3, D4 and D5 together forming a bridge rectifier; a capacitor C1; a capacitor C2; a relay K1 having a coil KC1 and normally-open (or "N-O") switch contacts KS1; a relay K2 having a coil KC2 and normally-closed (or "N-C") switch contacts KS2; a double-pole double-throw (or "DPDT") relay K3 having a solenoid S3 with terminals S31 and S32, and N-O DPDT switch contacts SW31 and SW32; a fuse F1; and a fuse F2 having terminals F21 and F22.

Resistor R1 may be a 6.6 kΩ, ½ watt (or watts or "W") resistor.

Relay K1 may be a 5 VDC (or "volts direct current") micro-mini relay rated for 1 ampere (or "A") at 24 VDC, such as Radio Shack (or "RS") Cat. No. 275-0240. Relay K1 alternatively may be any other type of relay.

Relay K2 may be a 9 VDC mini relay, such as RS Cat. No. 275-0005. Relay K2 alternatively may be any other type of relay.

Fuse F1 may be a ½ A, AGC fuse, such as RS Cat. No. 270-1003. Fuse F1 alternatively may be any other type of fuse.

Fuse F2 may be a 2 A, AGC fuse, such as RS Cat. No. 270-1007. Fuse F1 alternatively may be any other type of fuse.

Transformer T1 may be with diode D1, with secondary winding S1 rated for 3.5 VDC and 240 mA, and with primary winding P1 rated for 120 VAC (or "volts alternating current"), and may be rated for 3 W, such as #92000. Transformer T1 alternatively may be any other type of transformer.

Transformer T2 may have primary winding P2 of 420Ω and rated for 120 VAC input, and secondary winding S2 of 1.6δ and rated for 9 V RMS and 450 mA. Transformer T2 alternatively may be any other type of transformer.

Each of diodes D2, D3, D4 and D5 may be a ¼ A silicon diode. Any or all of diodes D2-D5 alternatively may be any other type of diode.

Each of capacitor C1 and capacitor C2 may be 450 μF at 10 V. Each of capacitor C1 and capacitor C2 may be electrolytic. Either or both of capacitor C1 and capacitor C2 alternatively may be any other type of capacitor.

In a normal 240 VAC electrical power system, an electrical power source provides electrical power to a load via three conductors including two source conductors and a third neutral conductor. FIG. 1 shows the monitor 100 connected between a load 10 and an electrical power source 20 via source conductors L1 and L2 and a neutral conductor N. Normally, source conductors L1 and L2 provide a voltage of 240 VAC between them so as to provide electrical power to the load 10; and the neutral conductor N has a voltage of zero relative to the voltage between L1 and L2. Under these conditions, electrical current flows from source conductor L1 through the monitor 100 to neutral conductor N. This flow of current is divided between two paths in the monitor 100. One of these two paths is through the primary winding P1 of transformer T1. The other path is through the resistor R1 in series with the primary winding P2 of transformer T2.

The flow of current through the primary winding of transformer T1 results in a voltage of about 118 VAC across the primary winding P1, which in turn induces a voltage of about 4.5 VAC across the secondary winding S1 of transformer T1. In this state (the normal state of the monitor 100), transformer T1 is in a saturated state. The alternating current (or "AC") in the secondary winding S1 is rectified by the diode D1 and capacitor C1, resulting in a direct current (or "DC") voltage across the coil KC1 of relay K1. In this state (the normal state of the monitor 100), relay K1 is energized by the voltage across the coil KC1, which causes the N-O contacts KS1 of relay K1 to close, forming a conductive path across the contacts KS1 of relay K1.

The flow of current through resistor R1 and primary winding P2 of transformer T2, results in a voltage of about 56 VAC across the resistor R1, and a voltage of about 69 VAC across the primary winding P1. The voltage across the primary winding P2 induces a voltage of about 5.8 VAC across the secondary winding S2 of the transformer T2. In this state (the normal state of the monitor 100), transformer T2 is in an unsaturated state. The alternating current in the secondary winding S2 is rectified by the bridge rectifier of diodes D2-D5 and capacitor C2, to produce a DC voltage across the coil KC2 of relay K2. The voltage across the coil KC2 is not sufficient to cause the N-C contacts KS2 of relay K2 to open. In this state (the normal state of the monitor 100), relay K2 is de-energized, and the N-C contacts KS2 of relay K2 remain closed, forming a conductive path across the contacts KS2 of relay K2.

The conductive paths across the contacts KS1 and KS2 of relays K1 and K2, respectively, together form a conductive path from the neutral conductor N to one terminal S31 of the solenoid S3. The fuse F2 creates another conductive path from source conductor L2 to the other terminal S32 of the solenoid S3. These conductive paths from each of source conductor L2 and neutral conductor N to respective terminals S31 and S32 of the solenoid S3, allow current to flow between source conductor L2 and neutral conductor N through the solenoid S3. In this state (the normal state of the monitor 100), the solenoid S3 is energized by the flow of current through the solenoid S3. The energizing of the solenoid S3 causes the two (DPDT) sets of N-O contacts SW31 and SW32, of the DPDT relay K3, to close. The closing of contacts SW31 creates a conductive path from source conductor L1 to the load 10. The closing of contacts SW32 creates another conductive path from source conductor L2 to the load 10. The conductive path from source conductor L1 to the load 10, and the other conductive path from source conductor L2 to the load 10, together provide 240 VAC from the electrical power source 20 to the load 10.

If power from the source 20 via source conductors L1 and L2 is lost, the voltage between source conductor L2 and neutral conductor N goes to zero volts. Thus, the voltage across the solenoid S3 goes to zero, which causes the contacts SW31 and SW32 of the DPDT relay K3 to open, interrupting power from the source 20 via source conductors L1 and L2 to the load 10. When the source 20 voltage goes back to normal, the solenoid S3 is re-activated, which closes the contacts SW31 and SW32 of the DPDT relay K3, restoring power to the load 10.

An increase of more than a pre-determined amount (e.g., 5 volts) in the source 20 voltage causes the voltage across the secondary winding S2 of transformer T2 to increase to a voltage sufficient to cause the N-C contacts KS2 of relay K2 to open. The opening of contacts KS2 interrupts current to the solenoid S3, which causes the contacts SW31 and SW32 of the relay K3 to open, interrupting power to the load 10. When the source 20 voltage goes back to normal (e.g., 240 VAC), relay K2 is deactivated and goes back to its N-C state. This restores current to the solenoid S3, which closes the contacts SW31 and SW32 of the relay K3, restoring power to the load 10.

A decrease of more than a pre-determined amount (e.g., 5 volts) in the source 20 voltage (or a complete loss of source 20 voltage), causes the voltage across the secondary winding S1 of transformer T1 to decrease below the voltage required to activate relay K1. This causes the contacts KS1 of relay K1 to go to their normally-open state. This opening of contacts KS1 interrupts current to the solenoid S3, causing the contacts SW31 and SW32 of the relay K3 to open, interrupting power to the load 10. When the source 20 voltage goes back to normal, relay K1 is re-activated and its contacts KS1 close. This restores current to the solenoid S3, which closes the contacts SW31 and SW32 of the relay K3, restoring power to the load 10.

If connection from source 20 to the neutral conductor N is lost (opened), then current no longer flows via monitor 100 to neutral conductor N. Rather, the current that would normally flow to neutral conductor N, is now added to the current that flows through the primary windings P1 and P2 of transformers T1 and T2, respectively. The increase in current through the primary winding P2 of transformer T2 causes the voltage across the secondary winding S2 of transformer T2 to increase to a voltage sufficient to activate relay K2 and cause the N-C contacts KS2 of relay K2 to open. This interrupts current to the solenoid S3, which causes the contacts SW31 and SW32 of the relay K3 to open, interrupting power to the load 10. When the source 20 voltage goes back to normal, relay K2 is deactivated and its N-C contacts KS2 go back to their normally-closed state. The closing of contacts KS2 restores current to the solenoid S3, which closes the contacts SW31 and SW32 of the relay K3, restoring power to the load 10.

Figure 2:
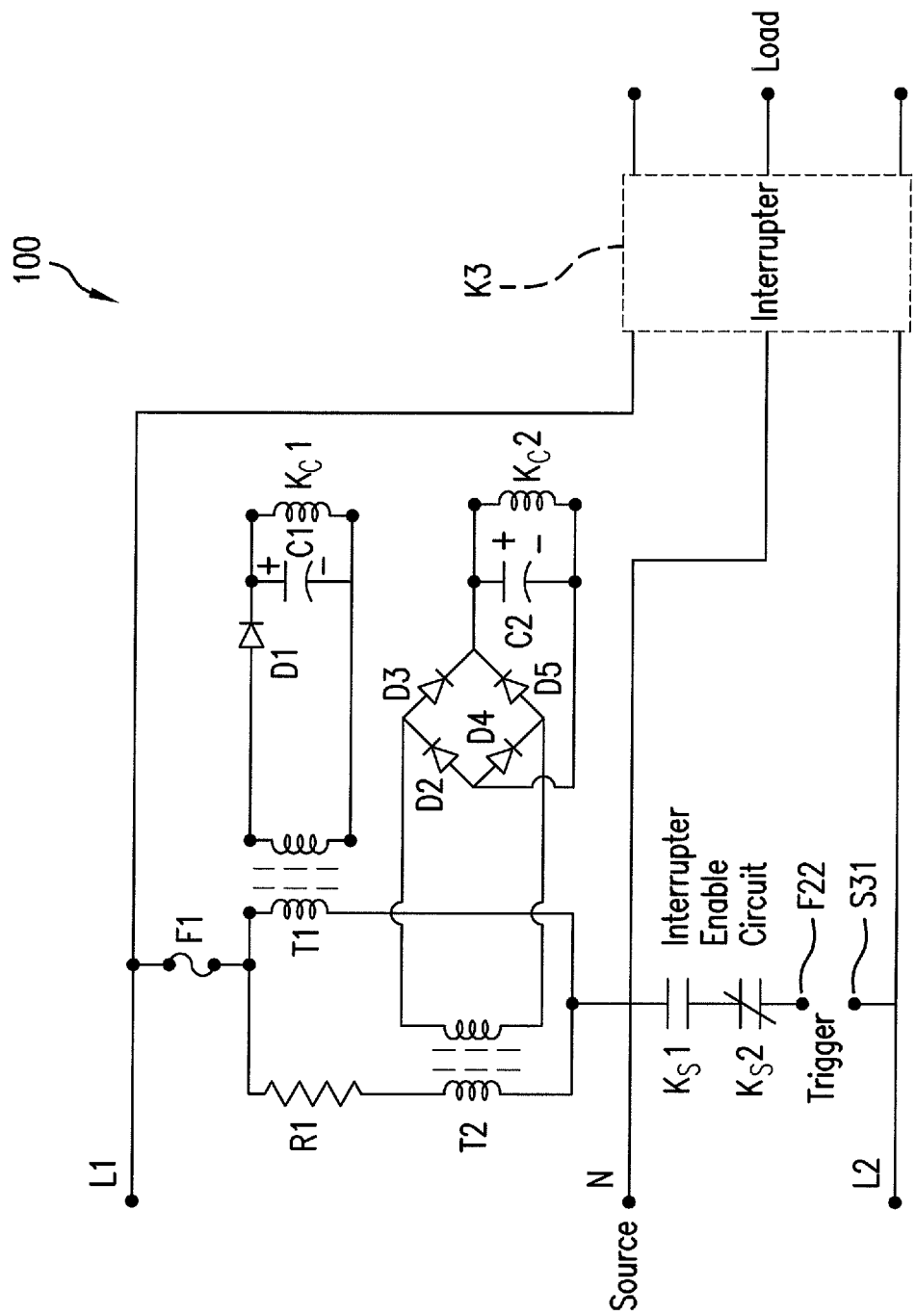
FIG. 2 is an alternative layout of the schematic of the preferred embodiment of the monitor circuit of the present invention.

FIG. 2 is an alternative schematic layout of the same circuit of the monitor 100 as shown in FIG. 1; except that FIG. 2 shows only the terminal S31 of the solenoid S3 rather than the whole solenoid S3, and shows only the terminal F22 of the fuse F2 rather than the whole fuse F2. With these exceptions, while the schematic of the monitor 100 in FIG. 2 has a different appearance than the schematic of the monitor 100 in FIG. 1, these two schematics of the monitor 100 are logically equivalent.

Figure 3:
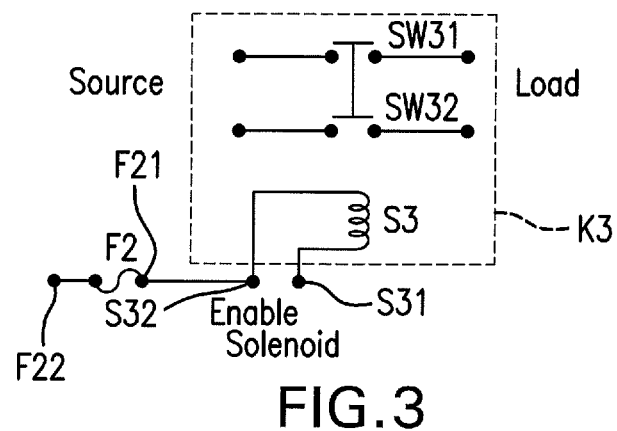
FIG. 3 is a schematic diagram of a detail of the preferred embodiment of the monitor circuit of the present invention.

FIG. 3 is a detail schematic diagram of the relay K3 shown in FIG. 1. In FIG. 3, the terminal S31 of the solenoid S3 is the same terminal S31 as shown in FIG. 2 and FIG. 1; and the terminal F22 of the fuse F2 is the same terminal F22 as shown in FIG. 2 and FIG. 1.

Figure 4:
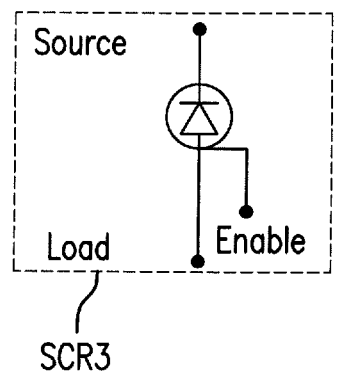
FIG. 4 is a schematic diagram of a detail of an alternative embodiment of the monitor circuit of the present invention.

FIG. 4 is a detail schematic diagram of a silicon-controlled rectifier (or "SCR") SCR3 that may be used in place of the relay K3 in an alternative embodiment of the present invention.

In a representative implementation of the present invention, the monitor 100 may be controlling 10-15 A loads on F, 10 wire fused for source conductors L1 and L2, and a 50 A contact starter.

As described herein, the present invention protects the load 10 against both over-voltage and under-voltage conditions of the source 20 voltage, and restores power to the load 10 when the source 20 voltage returns to normal.

In alternative embodiments of the present invention, any or all quantities described herein may have any value or values other than those specified.

In use, the interrupter terminates power upon receiving a signal as described herein. The protective device monitors service hot legs and neutral. The protective device automatically disconnects and resets to restore power caused by equipment failure or outside forces that exert incorrect voltage, loss of neutral, or hot legs. The device protects against damage from:

Voltage that is higher or lower than specified;
Loss of neutral;
Loss of either hot leg;
Transformer failure;
Inadvertently energized neutral;
Overhead or underground service failure;
Dig-ins of underground services (contractors or individuals);
Animals (e.g., squirrels and birds);
Feedback from customer generators.

Electric company liability for fires and other damage claims is thereby reduced or eliminated, including claims for loss of neutral and unbalanced load.

The device also protects the electrical customer property from wiring shorts and fires. The device will interrupt power automatically for a house fire, even those that are not the result of irregular electrical service. Insurance claims are therefore reduced.

What is claimed:

1. An circuit interruption device coupled between a source and a load comprising:
a neutral conductor;
a first source conductor having a first electrical current that flows to the neutral conductor through a first path comprising a first transformer, the first transformer having a first winding whose voltage controls a first relay circuit, and a second path comprising a resistor in series with a second transformer, the second transformer having a second winding whose voltage controls a second relay circuit; and
a second source conductor having a second electrical current that flows to the neutral conductor through a solenoid and further directed through the first relay circuit in series with the second relay circuit,
wherein the solenoid closes at least one of a first contact to form a first conductive path between the first source conductor and the load and a second contact to form a second conducive path between the second source conductor and the load when energized and the solenoid opens at least one of the first contact and the second contact when deenergized.

2. The circuit interruption device of claim 1, wherein the second electrical current flows through a fuse in series with the solenoid.

3. The circuit interruption device of claim 1, wherein a loss in voltage from the source causes the solenoid to deenergize.

4. The circuit interruption device of claim 1, wherein a decrease in voltage from the source of a set amount causes a voltage across the first winding to decrease to an amount to open the first relay circuit and deenergize the solenoid.

5. The circuit interruption device of claim 1, wherein an increase in voltage from the source of a set amount causes a voltage across the second winding to increase to an amount to open the second relay circuit and deenergize the solenoid.

6. The circuit interruption device of claim 1, wherein at least one of the first winding comprises a first secondary winding that opens the first relay circuit and the second winding comprises a second secondary winding that opens the second relay circuit.

7. The circuit interruption device of claim 6, wherein the first winding additionally comprises a primary winding rated for 120 volts alternating current (VAC) and the first secondary winding rated for 3.5 volts direct current (VDC).

8. The circuit interruption device of claim 6, wherein the second winding additionally comprises a primary winding rated 120 VAC and the second secondary winding rated 9 V root-mean-squared.

9. The circuit interruption device of claim 6, wherein an alternating current in the first secondary winding is rectified by a diode and a capacitor such that a direct current across a coil causes relay contacts to close to form a conductive path to close the first relay circuit when a sufficient amount of voltage is applied across the coil.

10. The circuit interruption device of claim 6, wherein an alternating current of the second secondary winding is rectified by a bridge rectifier of diodes and a capacitor such that a direct current across a coil causes relay contacts to close to form a conductive path to close the second relay circuit when a sufficient amount of voltage is applied across the coil.

11. The circuit interruption device of claim 1, wherein an open connection between the source and the neutral conductor causes a voltage across the second winding to increase to an amount to open the second relay circuit and deenergize the solenoid.

12. The circuit interruption device of claim 11, wherein the open connection that becomes closed causes the voltage across the second winding to decrease to an amount to close the second relay circuit and energize the solenoid.

13. The circuit interruption device of claim 1, wherein a relay forms at least one of the first conductive path and the second conductive path.

14. The circuit interruption device of claim 1, wherein a silicon-controlled rectifier forms at least one of the first conductive path and the second conductive path.

15. A method of interrupting a circuit between a source and a load comprising the steps of:
    closing a first conductive path between a first source conductor and the load and a second conductive path between a second source conductor and load when a solenoid is energized;
    opening the first conductive path and the second conductive path when a solenoid is deenergized; and
    deenergizing the solenoid upon the occurrence of any one or more of the following:
        a loss in voltage from the source,
        a decrease in voltage from the source of a set amount,
        an increase in voltage from the source of a set amount, and
        an open circuit between a neutral conductor and the source.

16. The method of claim 15, wherein the closing and opening of the first conductive path and second conductive path is by a relay.

17. The method of claim 15, wherein the closing and opening of the first conductive path and second conductive path is by a silicon-controlled rectifier.

18. The method of claim 15, further comprising the step of automatically energizing the solenoid and closing the first conductive path between the first source conductor and the load and the second conductive path between the second source conductor and load when there is
    no loss in voltage from the source,
    no decrease in voltage from the source below the set amount,
    no increase in voltage from the source above the set amount, and
    no open circuit between a neutral conductor and the source.

* * * * *